(12) United States Patent
Simonson et al.

(10) Patent No.: US 10,614,157 B1
(45) Date of Patent: Apr. 7, 2020

(54) SYSTEMS, METHODS, AND COMPUTER PROGRAM PRODUCTS FOR SLOT NORMALIZATION OF TEXT DATA

(71) Applicant: BLACKBOILER LLC, Arlington, VA (US)

(72) Inventors: Daniel E. Simonson, Arlington, VA (US); Jonathan Herr, Washington, DC (US); Joey T. Avant, Arlington, VA (US); Garen P. Riedel, Brooklyn, NY (US); Daniel P. Broderick, Arlington, VA (US)

(73) Assignee: BLACKBOILER, LLC, Arlington, VA (US)

( * ) Notice: Subject to any disclaimer, the term of this patent is extended or adjusted under 35 U.S.C. 154(b) by 0 days.

(21) Appl. No.: 16/410,023

(22) Filed: May 13, 2019

Related U.S. Application Data

(63) Continuation of application No. 16/197,769, filed on Nov. 21, 2018, now Pat. No. 10,311,140, which is a continuation of application No. 16/170,628, filed on Oct. 25, 2018, now abandoned.

(51) Int. Cl.
| | |
|---|---|
| *G06F 17/24* | (2006.01) |
| *G06F 16/23* | (2019.01) |
| *G06F 3/0482* | (2013.01) |
| *G06F 17/21* | (2006.01) |
| *G06F 16/93* | (2019.01) |
| *G06F 17/27* | (2006.01) |

(52) U.S. Cl.
CPC ............ *G06F 17/24* (2013.01); *G06F 3/0482* (2013.01); *G06F 16/2379* (2019.01); *G06F 16/93* (2019.01); *G06F 17/212* (2013.01); *G06F 17/278* (2013.01)

(58) Field of Classification Search
CPC ....................................................... G06F 16/93
See application file for complete search history.

(56) References Cited

U.S. PATENT DOCUMENTS

| | | | |
|---|---|---|---|
| 5,692,206 A | 11/1997 | Shirley | |
| 6,438,543 B1 * | 8/2002 | Kazi | ..................... G06F 16/382 |
| 7,080,076 B1 | 7/2006 | Williamson | |

(Continued)

FOREIGN PATENT DOCUMENTS

WO        0244932 A2     6/2002

OTHER PUBLICATIONS

Chambers, N. and Jurafsky, D., "Unsupervised learning of narrative event chains," Proceedings of ACL-08, Columbus, Ohio, Jun. 2008, pp. 789-797.

(Continued)

*Primary Examiner* — Asher D Kells
(74) *Attorney, Agent, or Firm* — Rothwell, Figg, Ernst & Manbeck, P.C.

(57) ABSTRACT

Methods, systems, and computer program products are provided for customization and insertion of a clause into an electronic document under analysis (DUA). The method includes the steps of receiving and electronic DUA, automatically detecting a slot type in the received DUA, assigning a DUA slot value to the detected slot type, and automatically updating one or more clauses in a clause library using the DUA slot value, wherein the updating includes inserting the DUA slot value into each slot in the one or more clauses having a slot type matching the detected slot type.

20 Claims, 17 Drawing Sheets

(56) References Cited

U.S. PATENT DOCUMENTS

| | | | |
|---|---|---|---|
| 7,668,865 B2 | 2/2010 | McDonald | |
| 8,037,086 B1* | 10/2011 | Upstill | G06F 17/2795 |
| | | | 707/767 |
| 8,442,771 B2* | 5/2013 | Wang | G16B 50/00 |
| | | | 702/19 |
| 10,102,193 B2* | 10/2018 | Riediger | G06F 17/00 |
| 10,191,893 B2* | 1/2019 | Riediger | G06F 16/00 |
| 2003/0023539 A1 | 1/2003 | Wilce | |
| 2003/0074633 A1 | 4/2003 | Boulmakoul | |
| 2005/0182736 A1 | 8/2005 | Castellanos | |
| 2007/0192355 A1 | 8/2007 | Vasey | |
| 2007/0192688 A1 | 8/2007 | Vasey | |
| 2007/0300295 A1 | 12/2007 | Kwok | |
| 2009/0099993 A1* | 4/2009 | Seuss | G06N 5/022 |
| | | | 706/47 |
| 2009/0138257 A1* | 5/2009 | Verma | G06F 17/274 |
| | | | 704/9 |
| 2009/0138793 A1* | 5/2009 | Verma | G06F 8/10 |
| | | | 715/234 |
| 2009/0216545 A1 | 8/2009 | Rajkumar et al. | |
| 2009/0300064 A1* | 12/2009 | Dettinger | G06Q 10/10 |
| 2009/0300471 A1* | 12/2009 | Dettinger | G06F 17/2247 |
| | | | 715/200 |
| 2010/0005386 A1* | 1/2010 | Verma | G06F 17/274 |
| | | | 715/237 |
| 2011/0055206 A1* | 3/2011 | Martin | G06F 17/2775 |
| | | | 707/723 |
| 2013/0036348 A1 | 2/2013 | Hazard | |
| 2013/0091422 A1 | 4/2013 | Potnis | |
| 2013/0151235 A1* | 6/2013 | Och | G06F 17/27 |
| | | | 704/9 |
| 2014/0040270 A1* | 2/2014 | O'Sullivan | G06F 17/2241 |
| | | | 707/739 |
| 2017/0039176 A1 | 2/2017 | Broderick | |
| 2017/0287090 A1 | 10/2017 | Hunn | |
| 2018/0005186 A1 | 1/2018 | Hunn | |
| 2018/0253409 A1 | 9/2018 | Carlson | |
| 2018/0268506 A1* | 9/2018 | Wodetzki | G06K 9/00456 |
| 2018/0365201 A1 | 12/2018 | Hunn | |
| 2018/0365216 A1* | 12/2018 | Kao | G06F 17/2775 |
| 2019/0065456 A1 | 2/2019 | Platow | |

OTHER PUBLICATIONS

Chambers, N. and Jurafsky, D., "Unsupervised learning of narrative schemas and their participants," Proceedings of the 47th Annual Meeting of the ACL and the 4th IJCNLP of the AFNLP, Suntec, Singapore, Aug. 2-7, 2009, pp. 602-610.

Chen, D. and Manning, C. D., "A fast and accurate dependency parser using neural networks," Proceedings of the 2014 Conference on Empirical Methods in Natural Language Processing, Doha, Qatar, Oct. 25-29, 2014, pp. 740-750.

Justeson, J. S., "Technical terminology: some linguistic properties and an algorithm for identification in text," 1995, Natural Language Engineering 1(1):9-27.

Honnibal, M. and Johnson, M., "An improved non-monotonic transition system for dependency parsing," Proceedings of the 2015 Conference on Empirical Methods in Natural Language Processing, Lisbon, Portugal, Sep. 17-21, 2015, pp. 1373-1378.

Petrov, S., et al., "Learning accurate, compact, and interpretable tree annotation," Proceedings of the 21st International Conference on Computational Linguistics and 44th Annual Meeting of the ACL, Sydney, Australia, Jul. 2006, pp. 433-440.

Simonson, D. E., "Investigations of the properties of narrative schemas," a dissertation submitted to the Faculty of the Graduate School of Arts and Sciences of Georgetown University, Washington, DC, Nov. 17, 2017, 259 pages.

International Search Report and Written Opinion for PCT/US2019/057906 dated Jan. 30, 2020, 13 pages.

* cited by examiner

7. Return of Confidential Information. If Receiving Party determine not to proceed with, or otherwise pursue a Potential Transaction Receiving will promptly notify the Company of its determination. If either Receiving Party or the Company determine for any reason not to proceed with or pursue a Potential Transaction then at any time upon the request by Company without the requirement for a reason therefore, Receiving Party will, and Receiving Party will direct its Representatives to, promptly either destroy or return (at its option) to the Company the Confidential Information which is in tangible form, including any copies which Receiving Party or its Representatives have made and all notes, summaries, analyses, compilations, memorandums, correspondence, studies or other documents or records prepared by Receiving Party or its Representatives, and to confirm to the Company in writing of such destruction that Receiving Party and its Representatives have done so. Notwithstanding the return or destruction of any Confidential Information, Receiving Party will continue to be bound by its obligations of confidentiality and other obligations hereunder.

200

Confidential Information 203

Receiving Party 205

Representatives 207

Company 209

Potential Transaction 211

FIG. 2A

... . If [Receiving Party] determine not ...

... Transaction , [Receiving Party] will promptly ...

... If either [Receiving Party] or the ...

... therefore , [Receiving Party] will , ...

... , and [Receiving Party] will direct ...

... copies which [Receiving Party] or its ...

... prepared by [Receiving Party] or its ...

... destruction that [Receiving Party] and its ...

... Information , [Receiving Party] will continue ...

Receiving Party 205

Link 205a

Link 205n

Confidential Information
203

Receiving Party
205

Company
209

7. Return of Confidential Information. If Receiving Party determine not to proceed with, or otherwise pursue a Potential Transaction, Receiving Party will promptly notify the Company of its determination. If either Receiving Party or the Company determine for any reason not to proceed with or pursue a Potential Transaction, then at any time upon the request by Company without the requirement for a reason therefore, Receiving Party will, and Receiving Party will direct its Representatives to, promptly either destroy or return (at its option) to the Company the Confidential Information which is in tangible form, including any copies which Receiving Party or its Representatives have made and all notes, summaries, analyses, compilations, memorandums, correspondence, studies or other documents or records prepared by Receiving Party or its Representatives, and to confirm to the Company in writing of such destruction that Receiving Party and its Representatives have done so. Notwithstanding the return or destruction of any Confidential Information, Receiving Party will continue to be bound by its obligations of confidentiality and other obligations hereunder.

SYSTEMS, METHODS, AND COMPUTER PROGRAM PRODUCTS FOR SLOT NORMALIZATION OF TEXT DATA

CROSS REFERENCE OF RELATED APPLICATIONS

This application is a continuation of U.S. application Ser. No. 16/197,769, filed on Nov. 21, 2018, which is a continuation of U.S. application Ser. No. 16/170,628, filed on Oct. 25, 2018. Reference is made to application U.S. patent application Ser. No. 15/227,093, filed Aug. 3, 2016, which is a non-provisional of, and claims the benefit of priority of, U.S. Prov. Pat. App. Ser. No. 62/200,261, in addition to U.S. Prov. Pat. App. Ser. No. 62/650,607, filed Mar. 30, 2018. The entirety of the aforementioned applications are hereby incorporated by reference.

TECHNICAL FIELD

Embodiments disclosed herein generally relate to systems, methods and computer program products for automated customization of clauses for insertion into a document under analysis.

BACKGROUND

During the review and/or markup of inbound contracts (a "Contract Under Analysis," or "CUA," or more generally a "Document Under Analysis," or "DUA"), human reviewers often rely upon a list of clauses that they repeatedly insert manually into the counterparty's contract ("Typical Clauses"). Some current methods for storing such a clause list include storing the Typical Clauses in electronic spreadsheet or document processing programs, such as Microsoft's Excel® and Word®. When the reviewer wants to insert a clause into a CUA, they manually copy the clause and paste it into the CUA.

Often the terminology in the Typical Clauses does not match the terminology used in the CUA. For example, in a non-disclosure agreement, certain terminology may be used to reference confidential information, the party receiving confidential information, the party disclosing confidential information, and the agreement. The party receiving confidential information may be referred to as the "Recipient," "Receiving Party," "the Company," or "you," among others. Likewise, the confidential information may be referred to as the "Confidential Information," the "Proprietary Information," the "Evaluation Material," or the "Information." Similar variations may exist, e.g., for the party disclosing confidential information, the name of an agreement, among other terminology that may be used in CUA or DUA.

More generically, such terminology used throughout a DUA may be referred to herein as a "Slot," and contracts in other domains may also contain slots. The Slots are often the parties to the contract, the subject of the contract, and the contract itself. For example, in a construction subcontract, the slots often refer to the "subcontractor," the "general contractor," the "project" and the "agreement."

When adapting a Typical Clause for insertion into a document, the human reviewer typically undergoes a tedious and manual process to adjust the Slots in the Typical Clause to match the Slots used in the DUA. For example, a human reviewer may rely on search and replace functions to update all of the Slots in any Typical Clauses the reviewer seeks to insert into the DUA. Further, the forms of the Slots in any Typical Clauses might not be standardized, thus requiring the human reviewer to search and replace for all possible forms of each Slot, thus multiplicatively increasing the time to insert such clauses and/or leading to forms forgotten, which are erroneously ambiguous. The likelihood of an error is further compounded by the need for each Slot to appear correctly grammatically in context—for example, a simple search and replace changing "Receiving Party" to "you" would introduce errors replacing "the Receiving Party's" with "you's." Thus, ensuring all appropriate substitutions have been identified, made, and had their context corrected grammatically represents a repetitive task that takes a lot of time to perform correctly and still has a high likelihood for error when all possible sources of human error are considered.

SUMMARY

Accordingly, there is a need for systems, methods and computer program products directed to a clause library that allows a contract reviewer to quickly insert Typical Clauses into a DUA without manually updating the Typical Clause's Slot.

According to one aspect, a computer-implemented method for customization and insertion of a clause into an electronic document under analysis is provided. The method includes the steps of: receiving an electronic document under analysis (DUA); automatically detecting a slot type in the received DUA; assigning a DUA slot value to the detected slot type; and automatically updating one or more clauses in a clause library using the DUA slot value, wherein the updating includes inserting the DUA slot value into each slot in the one or more clauses having a slot type matching the detected slot type.

In some embodiments, the step of automatically detecting a slot type in the received DUA further includes: extracting a chain from the DUA; affixing one or more slot types to the extracted chain, wherein the affixing results in a set of permutations, each permutation comprising one of the one or more slot types and the extracted chain; submitting each of the permutations to a scoring function; and associating one of the slot types to the extracted chain based on a value output from the scoring function.

In some embodiments, the step of assigning a DUA slot value to the detected slot type further includes: correlating a surface form of the extracted chain with the associated slot type, wherein the assigned DUA slot value comprises the surface form.

In some embodiments, the step of extracting the chain from the DUA further includes: identifying, in the DUA, all expressions referring to a same entity, derived via coreference, through named entity linking, or other such techniques; and creating a set of one or more links, each link comprising a location in the DUA with the identified expression referring to the same entity.

In some embodiments, the method further includes: extracting a feature from the identified expression of the one or more links, and wherein the scoring function is configured to compute an associative measure between the extracted feature and each of the one or more slot types.

In some embodiments, the method further includes: storing the detected slot type and assigned DUA slot value in a database, wherein the detected slot type and assigned slot value are associated with the DUA in the database.

In some embodiments, the method further includes: displaying the DUA on a graphical user interface; displaying the updated one or more clauses on the graphical user interface; receiving an indication that a user has selected one of the displayed updated one or more clauses; and inserting into the DUA the selected updated clause.

In some embodiments, the method further includes: displaying the detected slot type and the assigned DUA slot value in the graphical user interface.

In some embodiments, the method further includes: receiving an instruction to modify the DUA slot value from a user; and, automatically updating the one or more clauses in the clause library using the modified DUA slot value.

In some embodiments, the graphical user interface includes a first area for displaying the DUA and a second area for displaying the updated one or more clauses, wherein the method further includes: inserting the selected updated clause at a location of a cursor in the DUA displayed in the first area of the graphical user interface.

According to another aspect, a system for customization and insertion of a clause into an electronic document under analysis (DUA) is provided. The system includes: a processor; a non-transitory computer readable memory coupled to the processor, wherein the processor is configured to: receive the electronic document under analysis (DUA); automatically detect a DUA slot type in the received DUA; assign a DUA slot value to the detected slot type; and automatically update one or more clauses in a clause library using the DUA slot value, wherein the updating includes inserting the DUA slot value into each slot in the one or more clauses having a slot type matching the selected slot type.

According to some embodiments, the processor is further configured to: extract a chain from the DUA; affix one or more slot types to the extracted chain, wherein the affixation results in a set of permutations, each permutation comprising one of the one or more slot types and the extracted chain; submit each of the permutations to a scoring function; and associate one of the slot types to the extracted chain based on a value output from the scoring function.

According to some embodiments, the processor is further configured to: correlate a surface form of the extracted chain with the associated slot type, wherein the assigned DUA slot value includes the surface form.

According to some embodiments, the processor is further configured to: identify, in the DUA, all expressions referring to a same entity; create a set of one or more links, each link including a location in the DUA with the identified expression referring to the same entity.

According to some embodiments, the processor is further configured to: extract a feature from the identified expression of one of the one or more links; and, wherein the scoring function is configured to compute an associative measure between the extracted feature and each of the one or more slot types.

According to some embodiments, the system further includes a display device coupled to the processor and the non-transitory computer readable memory, wherein the processor is further configured to: display the DUA on a graphical user interface on the display device; display the updated one or more clauses on the graphical user interface on the display device; receive an indication that a user has selected one of the displayed updated one or more clauses; and insert into the DUA the selected updated clause.

According to some embodiments, the processor is further configured to: display the detected slot type and the assigned DUA slot value in the graphical user interface on the display device.

According to some embodiments, the processor is further configured to: receive an instruction to modify the DUA slot value from a user; and, automatically update the one or more clauses in the clause library using the modified DUA slot value.

According to some embodiments, the graphical user interface includes a first area for displaying the DUA and a second area for displaying the updated one or more clauses, wherein the processor is further configured to: insert the selected updated clause at a location of a cursor in the DUA displayed in the first area of the graphical user interface on the display device.

According to yet another aspect, a non-transitory computer readable medium storing instructions configured to cause a computer to perform a method for customization and insertion of a clause into an electronic document under analysis is provided.

BRIEF DESCRIPTION OF THE DRAWINGS

The accompanying drawings, which are incorporated herein and form part of the specification, illustrate various embodiments.

FIG. 2A is an example of five potential chains extracted from text, according to some embodiments.

FIG. 2B is an example of a potential chain extracted from text, according to some embodiments.

FIG. 5 is an example of three selected chains extracted from text, according to some embodiments.

FIG. 8 is a screen capture of a user interface for inserting a clause into a document under analysis, according to some embodiments.

FIGS. 10A-10B are screen captures of a user interface for inserting a selected clause into a document under analysis, according to some embodiments.

DETAILED DESCRIPTION

Figure 1:
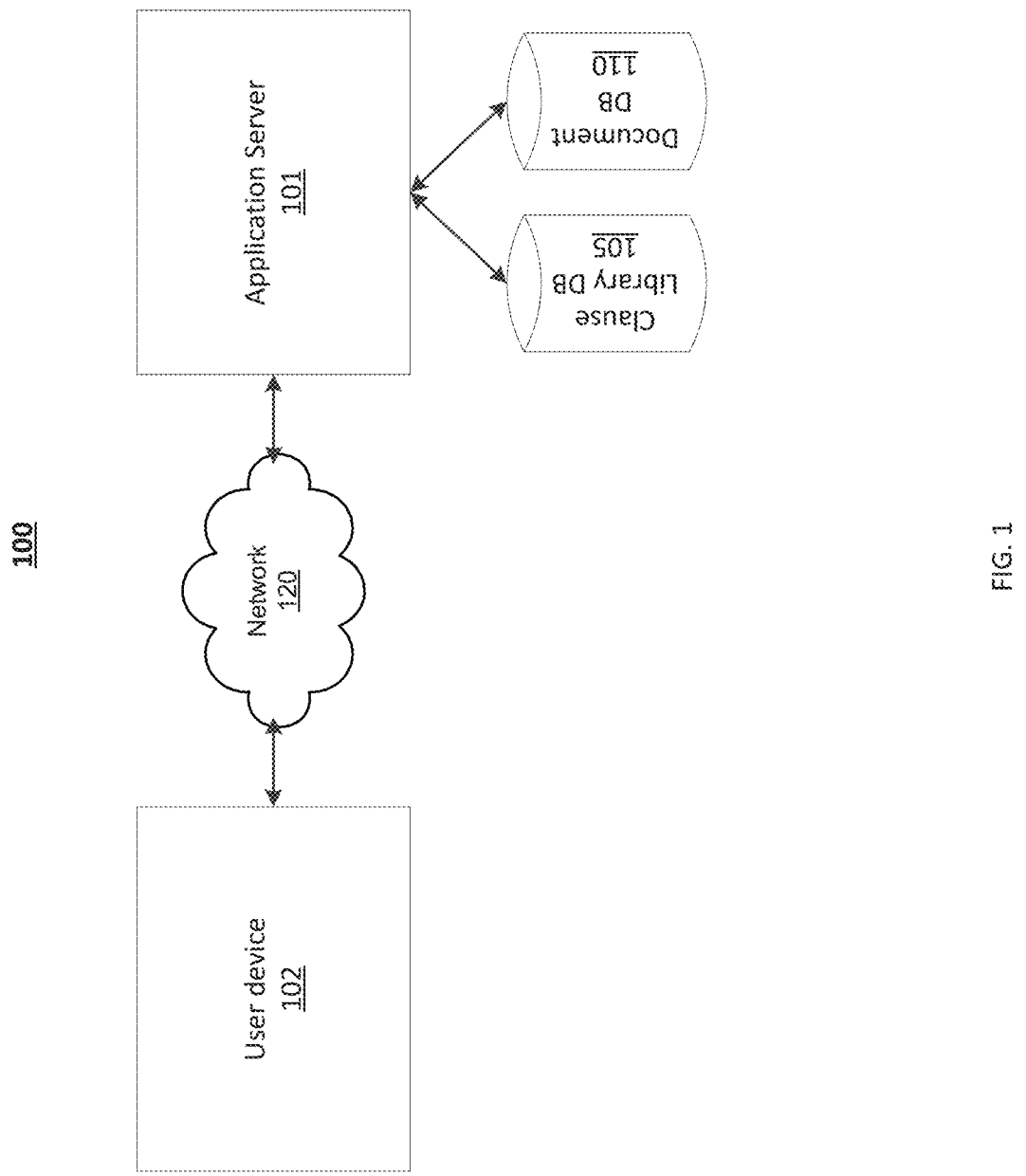
FIG. 1 is a block diagram illustrating a clause library system, according to some embodiments.

As discussed above, there is a need to provide more economical and efficient means to edit documents through the insertion of clauses due to the laborious and lengthy process of prior manual methods. The manual methods were cumbersome as they require multiple documents—e.g., one document to edit and a separate document with Typical Clauses. Moreover, the manual find and replace procedures are error prone, and these errors only compound when taking into account possessive forms and proper verb/subject agreement (e.g., conjugation). The prior art manual methods also could not be automated due to the need to fine tune the Typical Clauses to fit the document specific terminology. For example, the manual methods require, inter alia, (i) finding each of the slots, (ii) copying and pasting, or re-typing the slot names, and (iii) confirming the slot names to grammatical rules.

Embodiments disclosed herein are directed to novel systems, methods and computer program products for a clause library, including automatic analysis and processing of clauses for insertion into a document under analysis. The embodiments disclosed herein offer the ability to automatically update and insert one or more Typical Clauses into a DUA by leveraging an artificial intelligence slot detection process uniquely designed to create and update clauses in a clause library on a document by document basis.

The embodiments disclosed herein provide an improvement over aspects of prior slot detection techniques by, inter alia, adapting and applying those techniques in a novel way. Prior techniques were often focused on the goal of discovery of slot types in a document, with varying degrees of success. By contrast, here the slot types for a set of documents may already be known, and that knowledge may be carried on and used to detect slot types in new documents. This in turn enables the slot detection techniques described herein to be applied in new ways, e.g., to transform a client's Typical Clauses into a set of custom clauses suitable for insertion into a DUA.

The embodiments disclosed herein for slot identification also have other applications. For example, slot types present in training data may be replaced with generic representations of those types in order to improve or optimize the training data and/or the performance of other artificial intelligence or machine learning applications, such as those described in co-pending U.S. patent application Ser. No. 15/227,093, filed Aug. 3, 2016, which is a non-provisional of, and claims the benefit of priority of, U.S. Prov. Pat. App. Ser. No. 62/200,261, in addition to U.S. Prov. Pat. App. No. 62/650,607. According to some embodiments of the slot identification procedure, a surface form of a slot type in a document is identified, the surface form in the document is substituted with a more generic representation of the slot type, and the document with the generic slot type in turn can be used for comparisons and for edit insertion. After edit insertion, if any, the generic form of the slot can then be replaced with the surface form of the slot to match the slots in the DUA.

FIG. 1 is a block diagram illustrating a clause library system 100, according to some embodiments. A user device 102, such as a computer, mobile device, tablet, and the like, may be in communication with one or more application servers 101. In some embodiments, the user device 102 is in communication with application server 101 via a network 120. In some embodiments, network 120 may be a local area network or a wide area network (e.g., the Internet).

In some embodiments, the clause library system 100 may further include one or more data sources, such as a clause library database 105 and a document database 110. The clause library database 105 may be configured to store one or more Typical Clauses. The document database 110 may be configured to store one or more documents, such as, for example, a DUA or CUA. According to some embodiments, user device 102 is able to obtain one or more clauses and/or documents from the clause library database 105 and the document database 110, respectively. In some embodiments, user device 102 obtains the one or more clauses and/or documents from the clause library database 105 and document database 110 remotely via the application server 101 over network 120. In other embodiments, the user device 102 obtains the one or more clauses and/or documents directly from the clause library database 105 and document database 110 via network 120. In yet other embodiments, the user device 102, clause library database 105, document database 110, and/or application server 101 may be co-located in the same environment or computer network, or in the same device.

As described in further detail below, in some embodiments, input to application server 101 from client device 102 may be provided through a web interface or an application programming interface (API), and the output from the application server 101 may also be served through the web interface or API.

While application server 101 is illustrated in FIG. 1 as a single computer for ease of display, it should be appreciated that the application server 101 may be distributed across multiple computer systems. For example, application server 101 may comprise a network of remote servers and/or data sources hosted on network 120 (e.g., the Internet) that are programmed to perform the processes described herein. Such a network of servers may be referred to as the backend of the clause library system 100.

Slot Identification

According to some embodiments, Slot identification has two identifiable components: training and use. Training may comprise taking a set of documents (e.g., a corpus) and annotation of Slot types over the documents, and using the corpus and annotations to create a model for use. Use may refer to using the model to determine any Slot types in new documents.

According to some embodiments, the Slot model is inspired by Nathanael Chambers and Dan Jurafsky, "Unsupervised Learning of Narrative Event Chains," Proceedings of ACL-08:HLT, pages 789-797 (June 2008) ("Chambers and Jurafsky 2008") and Nathanael Chambers and Dan Jurafsky, "Unsupervised Learning of Narrative Schemas and their Participants," Proceedings of the $47^{th}$ Annual Meeting of the ACL and the $4^{th}$ IJCNLP of the AFNLP, pages 602-610 (August 2009) ("Chambers and Jurafsky 2009"), the disclosures of which are hereby incorporated by reference in their entirety. In their model, Chambers and Jurafsky use coreference chains and other linguistic annotations to generate narrative event chains and narrative schemas in an unsupervised manner.

According to some embodiments disclosed herein, chains are used to extract and identify features. However, the present model has very different goals and inputs than the Chambers and Jurafsky model. Some of those differences include, inter alia, (i) the introduction of a supervised component, (ii) leveraging other features in identification of chains, and (iii) targeting a fundamentally different goal, including identifying the Slot types of specific chains in a target document instead of generating generic chains.

Model Training

According to some embodiments, a model is used to predict the Slot type present in a DUA. Training the model may require two kinds of data. The first is a set of documents called the training corpus. The second is a set of annotations containing the surface form of each Slot type for each corresponding document in the training corpus. The surface form is how the Slot type is referred to in each corresponding document.

As one example, Table 1 below depicts an example set of Slot annotations for each document in a training corpus of non-disclosure contracts.

TABLE 1

Annotations of Slot Type

| Document | Disclosing Party | Receiving Party | Confidential Information | Contract |
|---|---|---|---|---|
| A | Acme, Inc | Interested Party | Information | Non-Disclosure Agreement |
| B | Disclosing Party | XYZ, Inc. | Confidential Information | Contract |
| C | Receiver | Potential Purchaser | Information | Mutual CDA |
| D | ABC, Co. | Company | Sensitive Data | Letter Agreement |
| E | We | You | Evaluation Material | Non-disclosure Agreement (NDA) |
| F | Provider | Recipient | Confidential Information | Agreement |
| G | Company | Receiving Party | Proprietary Information | Confidentiality Agreement |

As shown in Table 1, for each contract in the training corpus (Documents A-G), the surface form of each Slot type ("Disclosing Party," "Receiving Party," "Confidential Information," and "Contract") is provided. For example, for Document A, the annotations include the surface form "Company" for the Disclosing Party Slot, the surface form "Interested Party" for the Receiving Party Slot, the surface form "Evaluation Material" for the Confidential Information Slot, and the surface form "Agreement" for the Contract Slot. For each slot, what their various surface forms share in common is that each specific surface form only negligibly changes the meaning of the clauses when the surface forms are interchanged—e.g. whether a contract uses "Confidential Information" or "Evaluation Material," both of those refer to the same sort of entity participating in the contract.

FIG. 2A is an example of five potential chains extracted from text, according to some embodiments. In the example shown in FIG. 2A, five chains are extracted from the text 200, including Confidential Information 203, Receiving Party 205, Representatives 207, Company 209, and Potential Transaction 211.

FIG. 2B is an example of a potential chain extracted from text, according to some embodiments. The example chain shown in FIG. 2B is the potential chain 205 for Receiving Party. The chain 205 may comprise a set of one or more links, 205a-205n, where each link 205a-205n is associated with a location in the text 200 with the identified expression (here, "Receiving Party") referring to the same entity.

Figure 3:
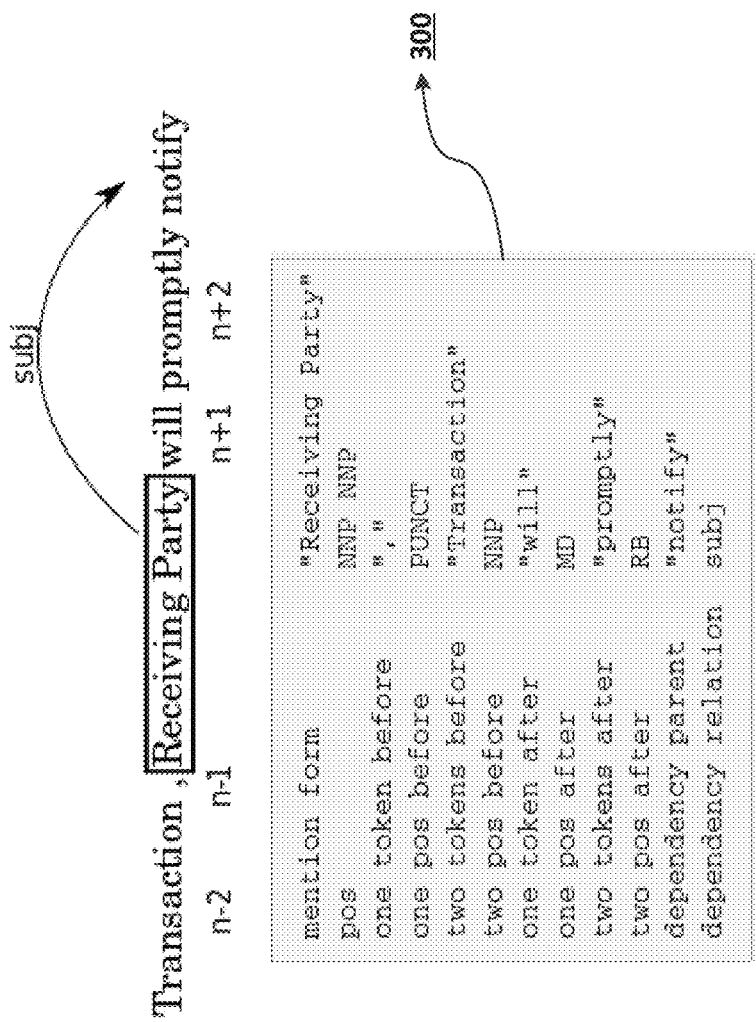
FIG. 3 is an example of a feature extraction process, according to some embodiments.

FIG. 3 is an example of a feature extraction process, according to some embodiments. For each document, a linguistic annotation is performed over the document using one or more techniques, including but not limited to word tokenization, sentence tokenization, part of speech tagging, sentence parsing, and coreference resolution, among others. These annotations may be conducted with manual, partially manual and partially automatic, or fully automatic techniques. For example, as shown in FIG. 3, a set of one or more features 300 may be extracted from an excerpt of the text 200. Here, the mention form is "Receiving Party," the dependency parent is "notify," and the dependency relation is subject.

Each Slot type may then be aligned with each of the specific chains in each document (e.g., chains 203, 205, 207, 209, and 211), based on the surface form of the links of the chain. All chains may be converted from features within the context of each link for each chain into counts of the co-occurrences of such features, including but not limited to the Slot type (or lack of Slot type) of the chain from which the tuple was extracted, overt information from the context of the link, information implicit from the context of the link, information in the linguistic annotations in the context of the link, and other such relevant information to each link. An example of this feature extraction process is illustrated in FIG. 3.

According to some embodiments, the association measure might be based on the number of times a candidate surface form from a particular set or list associated with each slot type appears in a DUA. For example, the list for Disclosing Party might be "Disclosing Party", "Receiver", "Provider", and "Company". In some embodiments, the association measure could be:

$$\text{assign}(K) = \operatorname*{argmax}_{i} \begin{cases} 0 & \text{``}c_i\text{''} \notin S_K \\ |c_i| & \text{``}c_i\text{''} \in S_K \end{cases}$$

where K is the class being assigned, c indicates a chain in the document, i indicates the index of a specific chain $c_i$, "$c_i$" indicates the surface form of $c_i$, and $S_K$ indicates the set or sequence of possible surface forms associated with Slot K. The function assign returns the index i of the chain assigned to class K, thus assigning Slot K to chain i.

According to some other embodiments, the counts of such features are used to produce a score (e.g., a model, function, or the like) which in turn may be used to rank encountered chains according to how suited they are to each slot type. In some embodiments, such ranking may encompass an explicit ordering, and in other embodiments a stochastic technique, or simple maximization and careful consideration of alternatives may be employed. According to some embodiments, the counts are used to approximate the single and joint probability distributions of the features with their membership in a specific class (e.g., Slot type), then use those probabilities to compute the pointwise mutual information (PMI) between the features and the class. In some embodiments, associative measures other than a PMI may be computed. Alternatively, a score could be a trained neural network, for example, although other functions or models may be used.

Additionally, a variety of features may be reviewed. In some embodiments, the only features that are explicitly extracted are the dependency relation and the dependency parent. In other embodiments, additional and/or other features may be extracted, such as the mention form.

According to some embodiments, the PMI can be expressly formally as:

$$pmi(K, m, r, p) = \log \frac{P(K, m, r, p)}{P(K)P(m)P(r)P(p)}$$

where K is the class of the slot (Slot type), m is the mention form, r is the dependency relation between the mention in the link of the chain and its parent, and p is the lemma of the parent.

According to other embodiments, the PMI can be expressed formally as:

$$pmi(K, r, p) = \log \frac{P(K, r, p)}{P(K)P(r)P(p)}$$

with the mention form m excluded.

The probabilities may be approximated as:

$$P(K, m, r, p) = \frac{C(K, m, r, p) + \lambda}{\sum_{L,n,s,t} C(L, n, s, t) + \lambda}$$

$$P(K, r, p) = \frac{C(K, r, p) + \lambda}{\sum_{L,n,s,t} C(L, s, t) + \lambda}$$

where the numerator contains C, a function indicating the counts of the number of times a particular pairing was found in the training data, and λ, a smoothing value (e.g., here set to 0.5). In some embodiments, anything that appears fewer than 5 times is treated as having appeared zero times. The denominator indicates the total number of things counted in the whole corpus. The summation in the denominator totals the counts of all possible pairs of K,m,r,p, but those names are taken by the function. L,n,s,t refers to those same values, but scoped to the summation. So, for example, L is a slot classification like K, s is a relation like r, t is a parent lemma like p.

For example, if there are 1,000 chains counted that were 10 items long, then $$\sum_{L,s,t} C(L, s, t) + \lambda = 10000.5.$$

If there were 20 instances where a link in chain labeled "Recipient" was related to the verb "disclose" via a subj relation, then we could compute that:

$$P(\text{``Recipient,''} subj, \text{``disclose''}) = \frac{C(\text{``Recipient,''} subj, \text{``disclose''}) + \lambda}{\sum_{L,n,s,t} C(L, s, t) + \lambda}$$

$$= \frac{20 + 0.5}{10,000.5}$$

$$= 0.2\%$$

These values may then be used to compute the pmi for each link in a chain, and in turn, to compute the score for the chain as a whole. Some methods used to compute the score for the chain as a whole include, inter alia:

$$pseudoaverage(K, c) = \sum_{i=0}^{|c|} pmi(K, *c_i) - |c|$$

$$average(K, c) = \frac{1}{|c|} \sum_{i=0}^{|c|} pmi(K, *c_i)$$

$$\text{sum}(K, c) = \sum_{i=0}^{|c|} pmi(K, *c_i)$$

As one example, consider three mentions of Receiving Party: (i) "Receiving Party will direct its Representatives," (ii) "Receiving Party determine not to proceed," and (iii) "other documents or records prepared by Receiving party." From each of these mentions, the two features of interest may be extracted (dependency relation and dependency parent), respectively: (i)<subj, "direct">, (ii)<subj, "determine">, and (iii)<prep_by, "prepare">.

For each class (Slot type), the entire chain may be scored as follows:

$$pmi(\text{``Recipient,''} subj, \text{``direct''}) = \log \frac{P(\text{``Recipient,''} subj, \text{``direct''})}{P(\text{``Recipient''})P(subj)P(\text{``direct''})}$$

$$= 3.68$$

$$pmi(\text{``Recipient,''} subj, \text{``determine''}) = \log \frac{P(\text{``Recipient,''} subj, \text{``determine''})}{P(\text{``Recipient''})P(subj)P(\text{``determine''})}$$

$$= 3.34$$

$$pmi(\text{``Recipient,''} prep\_by, \text{``prepare''}) = \log \frac{P(\text{``Recipient,''} prep\_by, \text{``prepare''})}{P(\text{``Recipient''})P(prep\_by)P(\text{``prepare''})}$$

$$= 0.0$$

These values may be added up using pseudoaverage. The length of the chain may be subtracted to account for really long chains.

$$pseudoaverage(\text{``Recipient,''} c) = \sum_{i=0}^{|c|} pmi(\text{``Recipient,''} *c_i) - |c|$$

$$pseudoaverage(\text{``Recipient,''} c) = pmi(\text{``Recipient,''} subj, \text{``direct''}) +$$
$$pmi(\text{``Recipient,''} subj, \text{``determine''}) +$$
$$pmi(\text{``Recipient,''} prep\_by, \text{``prepare''}) - |c|$$

$$Pseudoaverage(\text{``Recipient,''} c) = 3.68 + 3.34 + 0.0 - 3 = 4.02$$

Accordingly, 4.02 is the score for that chain for the "Recipient" Slot, and this process is repeated for all Slots prescribed in the training data. For each of the Slots, the chain that scored the highest is assigned, and no other chains are assigned to that Slot.

Chambers & Jurafsky (2008) compare events with one another to generate narrative event chains, and later narrative schemas (Chambers & Jurafsky, 2009), as part of an unsupervised learning process. In other words, for Chambers and Jurafsky, the candidate "slot" is whether an event verb fits with another event verb. By contrast, the disclosed embodiments evaluate whether the dependency parent—regardless of grammatical category—fits with a particular annotated Slot type.

Figure 4:
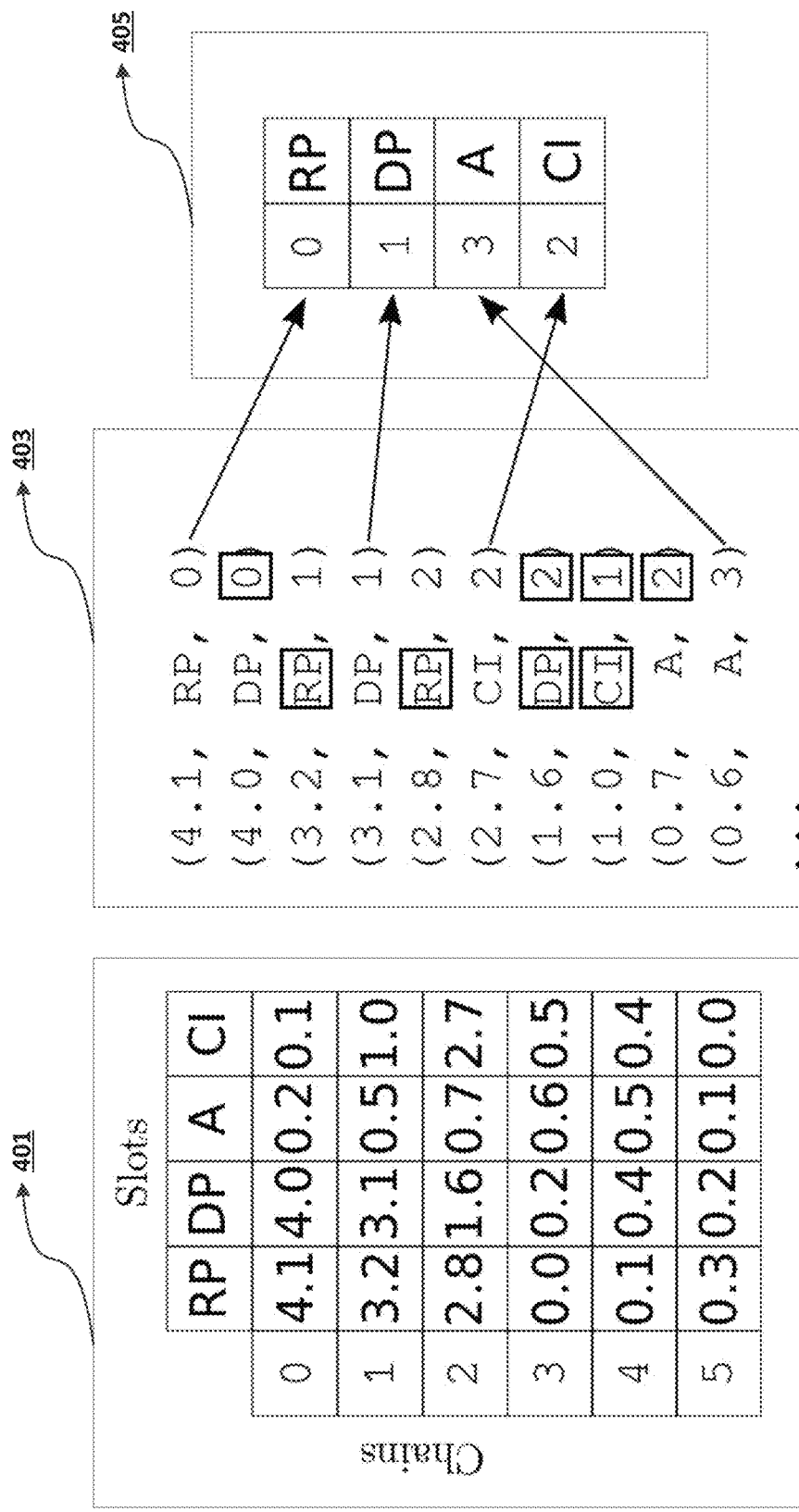
FIG. 4 is an analysis of extracted chains, according to some embodiments.

FIG. 4 is an analysis of extracted chains, according to some embodiments. As shown in FIG. 4, a set of permutations is created with each identified chain and each annotated Slot type—here, RP for "Receiving Party," DP for "Disclosing Party," A for "Agreement," and CI for "Confidential Information." The set of permutations may be generated by affixing each Slot type to each identified chain. For example, each Slot Type {RP, DP, A, CI} may be affixed to chain 0 in order to create the following set of permutations: {(RP, 0), (DP, 0), (A, 0), (CI, 0)}. A set of scores for each permutation of Slot Type (RP, DP, A, CI) and chain (0, 1, 2, 3, 4, 5) is provided in the matrix 401 (e.g., score 4.1 for the Slot type "RP" and chain "0" permutation). Each score reflects how suited each encountered chain is to each slot type, and the scores are ranked as shown in ranking 403. As shown in the assignment 405 in FIG. 4, each of chains 0, 1, 3, and 2 is assigned to a Slot type RP, DP, A, and CI, respectively using the ranking. In some embodiments, a chain can only be assigned to one slot type.

FIG. 5 is an example of three selected chains extracted from text, according to some embodiments. In the example shown in FIG. 5, a set of chains—a set of links which correspond to locations within the text 200—is extracted from the document. The set of chains includes a chain for Confidential Information 203, a second chain for Receiving Party 205, and a third chain for Company 209, where chain 203, 205, and 209 is assigned a slot type Confidential Information, Receiving Party, and Company, respectively. As shown in FIG. 5, the set of selected chains 203, 205, 209 may be a subset of all potential chains 203, 205, 207, 209, and 211 originally extracted from text 200 as shown in FIGS. 2A-2B. That is, as a result of the analysis of each extracted chain, not all identified chains may be assigned a Slot type.

Model Use

According to some embodiments, when a new document is introduced to the clause library system 100, the same linguistic annotations as previously discussed may be performed, and chains are again extracted. Features are extracted analogously to the method used on the chain interpretation function, but these features for each potential chain are given to the score or model, which then gives score values to each chain for each possible Slot type. The selected Slot chains are those that scored most consonantly with each Slot type. The surface form of each Slot chain is selected to fill each corresponding slot in the clause library.

Figure 6:
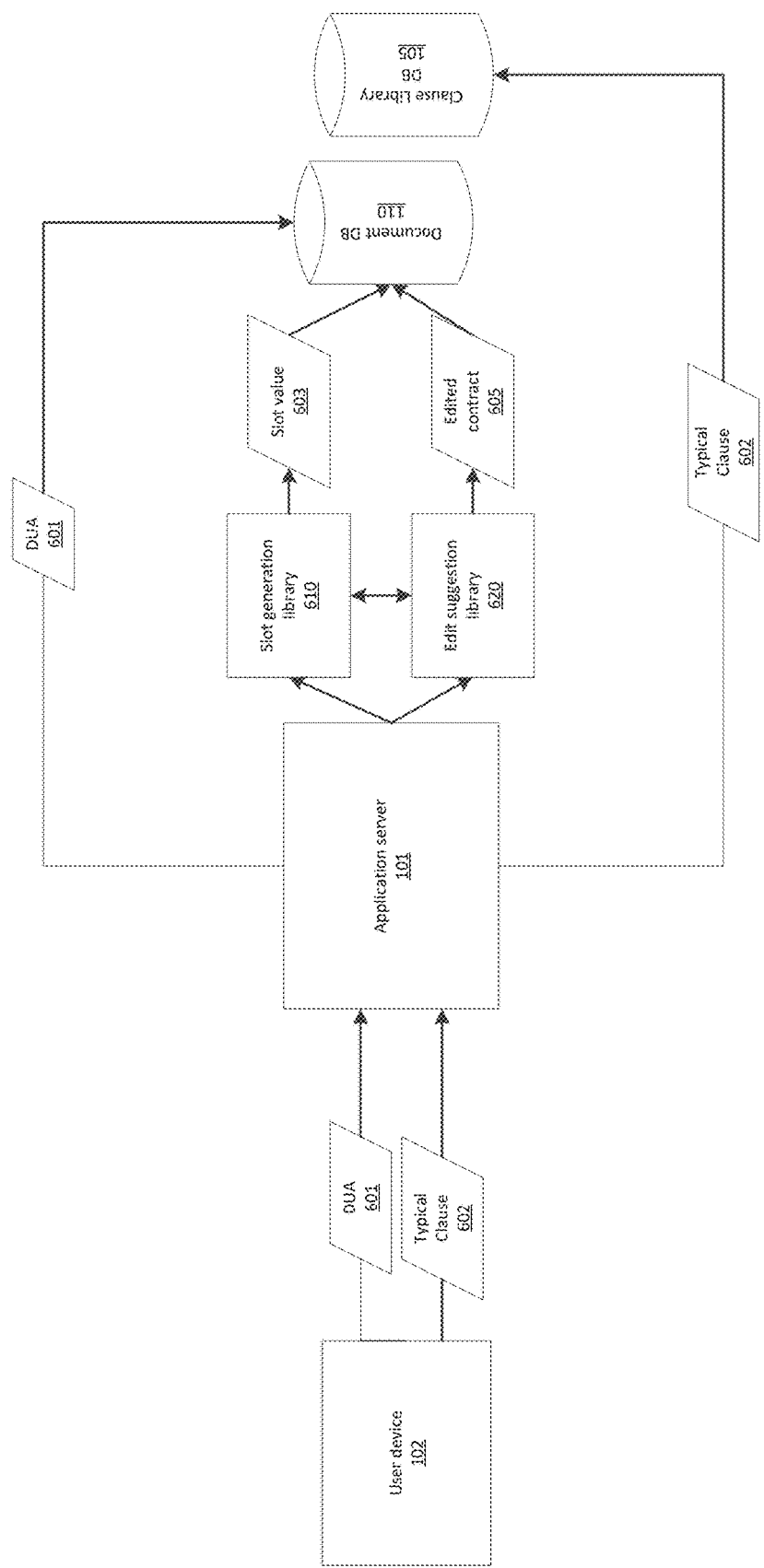
FIG. 6 is a data flow diagram of a document upload process with slot generation, according to some embodiments.

FIG. 6 is a data flow diagram of a document upload process with slot generation, according to some embodiments. As shown in FIG. 6, a user may upload a previously unseen document (DUA) 601 to application server 101 using a web interface displayed on user device 102. In some embodiments, the application server 101 stores the received DUA 601 in document database 110. Additionally, a user may upload a Typical Clause 602 to application server 101 using a web interface displayed on user device 102. In some embodiments, the application server 101 stores the received Typical Clause 602 in the clause library database 105.

In some embodiments, the user may upload clause text labeled and annotated with clause name and slot names. For example, a user may labels a slot in the clause with an annotation such as $ReceivingParty in place of the surface form of the slot that may be replaced by the system at clause insertion time. In some embodiments, a slot type identification process may be used to automatically extract typical slots used by a client in historical documents according to the slot type identification model, which extracts and names slots. Slot types may be separately stored in the clause library database, and used by the slot extraction process and the clause identification process. The client slot extraction model may be built from the historical corpus and the slot types extracted. Additionally, in some embodiments, using a corpus of a client's historical contracts, a clause classification process first uses the client slot model to populate slots with slot names and then label sentences according to a model of well-known clause language with clause labels (e.g., Warranty, Indemnification, etc.). Sentences may be collected into clauses according to boundaries between clause labels and added to the clause library database.

According to some embodiments, the application server 101 may comprise one or more software modules, including slot generation library 610.

Slot generation library 610 may comprise programming instructions stored in a non-transitory computer readable memory configured to cause a processor to implement the chain extraction and Slot Type assignment features discussed above in connection with FIGS. 2-5, and as described below in further detail in connection with FIGS. 11-12. As a result of these processes, the slot generation library 610 may output a set of one or more slot values 603 corresponding to the received DUA. Each Slot value 603 may be associated with a Slot type, such as the annotated Slot type from the training model discussed above. The application server 101 may store Slot value 603 in association with the DUA 601 in document database 110.

Edit suggestion library 620 may comprise programming instructions stored in a non-transitory computer readable memory configured to cause a processor to suggest edits to the DUA 601. The edit suggestion library 620 may perform alignment, edit suggestion, and edit transfer procedures to, inter alia, determine which sentences in a document should be accepted, rejected, or edit, and transfers edits into the document. The application server 101 may store the resulting edited contract or set of one or more edits to the contract 605 in association with the DUA 601 in document database 110. The edit suggestion features are described more fully in co-pending U.S. patent application Ser. No. 15/227,093, filed Aug. 3, 2016, which is a non-provisional of, and claims the benefit of priority of, U.S. Prov. Pat. App. Ser. No. 62/200,261, in addition to U.S. Prov. Pat. App. No. 62/650, 607, the contents of which are incorporated herein by reference.

In some embodiments, the slot generation library 610 and the edit suggestion library 610 may be used in combination. For example, the edit suggestion library 610 may benefit when used in conjunction with a slot normalization process utilizing slot generation library 610 where the surface form of slot types are replaced with generic terms. During alignment, unseen sentence may be aligned with an optimal set of training sentences for which the appropriate edit operation is known (e.g., accept, reject, edit). However, during alignment, small differences in sentences can tip the similarity algorithms one way or the other. By introducing slot normalization to the training data when it is persisted to the training database, and again to each sentence under analysis, the likelihood of alignment may be increased when terms differ lexically but not semantically (for instance "Information" vs "Confidential Information"). If an edit is required, the edit transfer process may use the normalized slots again to improve sub-sentence alignment. The edit transfer process may search for equal spans between the training sentence and the SUA in order to determine where edits can be made. Slot normalization may increase the length of these spans, thereby improving the edit transfer process.

The clause library system 100 may comprise some or all of modules 610, 620, and databases 110 and 104 as depicted in FIG. 6.

Figure 7:
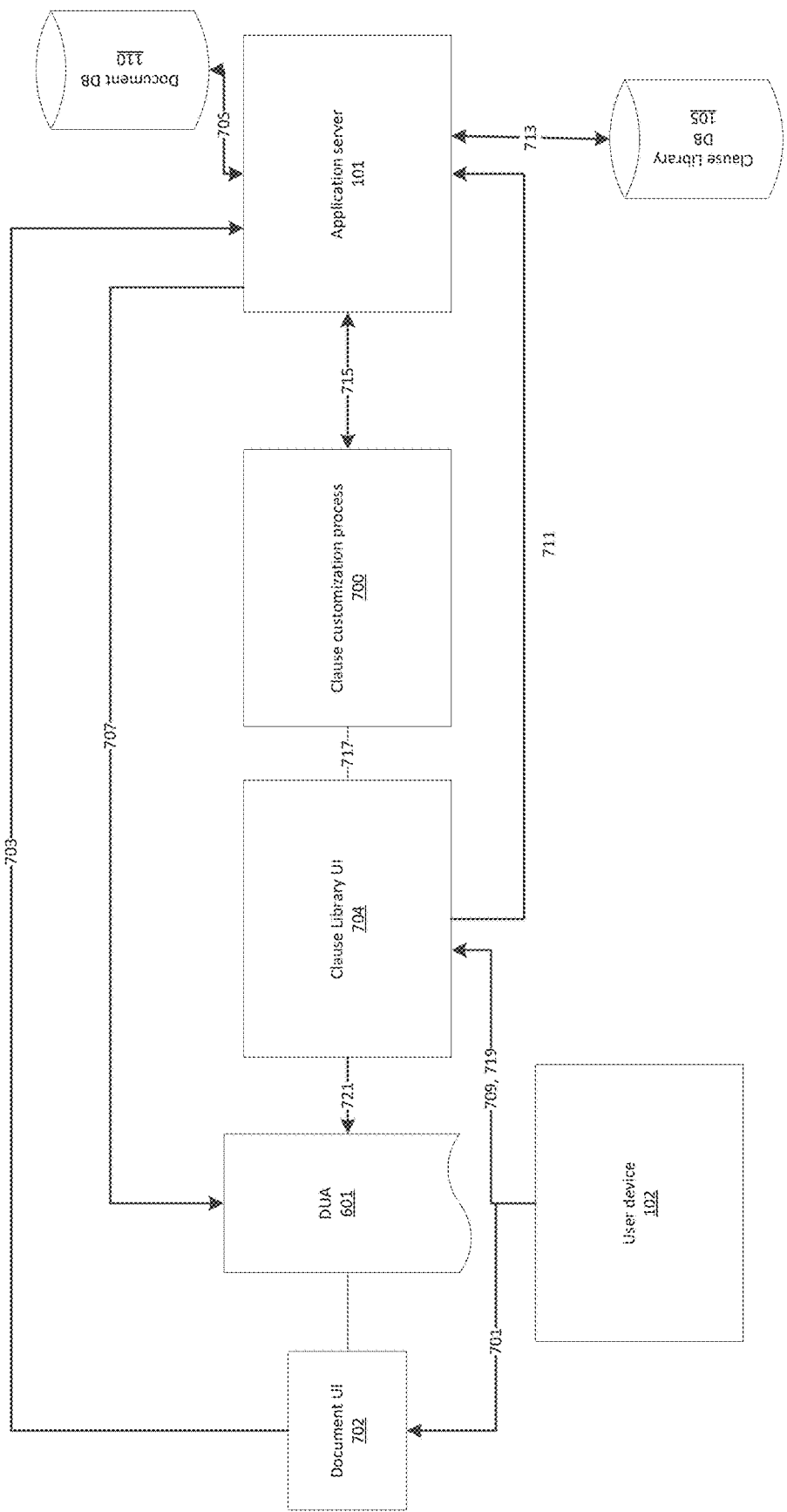
FIG. 7 is a data flow diagram of insertion of a clause into a document, according to some embodiments.

FIG. 7 is a data flow diagram of insertion of a clause into a document, according to some embodiments. According to some embodiments, user device 102 may be operative to display on a display device a document user interface 702 and a clause library user interface 704, discussed in further detail in connection with FIGS. 8, 9A-9C, and 10A-B.

At 701, document user interface 702 receives a request from user device 102 to display a DUA 601. At 703, the document user interface 702 sends a request to the application server 101 for the DUA 601, and at 705 the application server 101 retrieves the DUA 601 from the document database 110. At 707, the application server 101 provides the DUA 601 for display on the document UI 702.

At 709, clause library user interface 704 receives a request from user device 102 to display a library of Typical Clauses for potential insertion into the DUA 601. At 711, the clause library user interface 704 transmits a request to application server 101 for the Typical Clauses, and at 713 the application server 101 in turn retrieves the Typical Clauses from the clause library database 105. The application server 101 in turn submits the retrieved Typical Clauses to a clause customization process 700, as described in further detail in connection with FIGS. 11 and 12. In some embodiments, the clause customization process is performed by the application server 101, and in other embodiments the clause customization process is performed locally by the user device 102. At 717, the custom Typical Clauses are provided to the clause library user interface 704 for display.

At 719, the clause library user interface 704 receives user input from user device 102 comprising a selection of one of the custom Typical Clauses displayed on the clause library user interface 704. At 721, the clause library user interface 704 automatically inserts the selected custom Typical Clause into the DUA 601. In some embodiments, the selected custom Typical Clause is inserted into the DUA 601 at a cursor location in the document UI 702 depicting the DUA 601.

Figure 8:
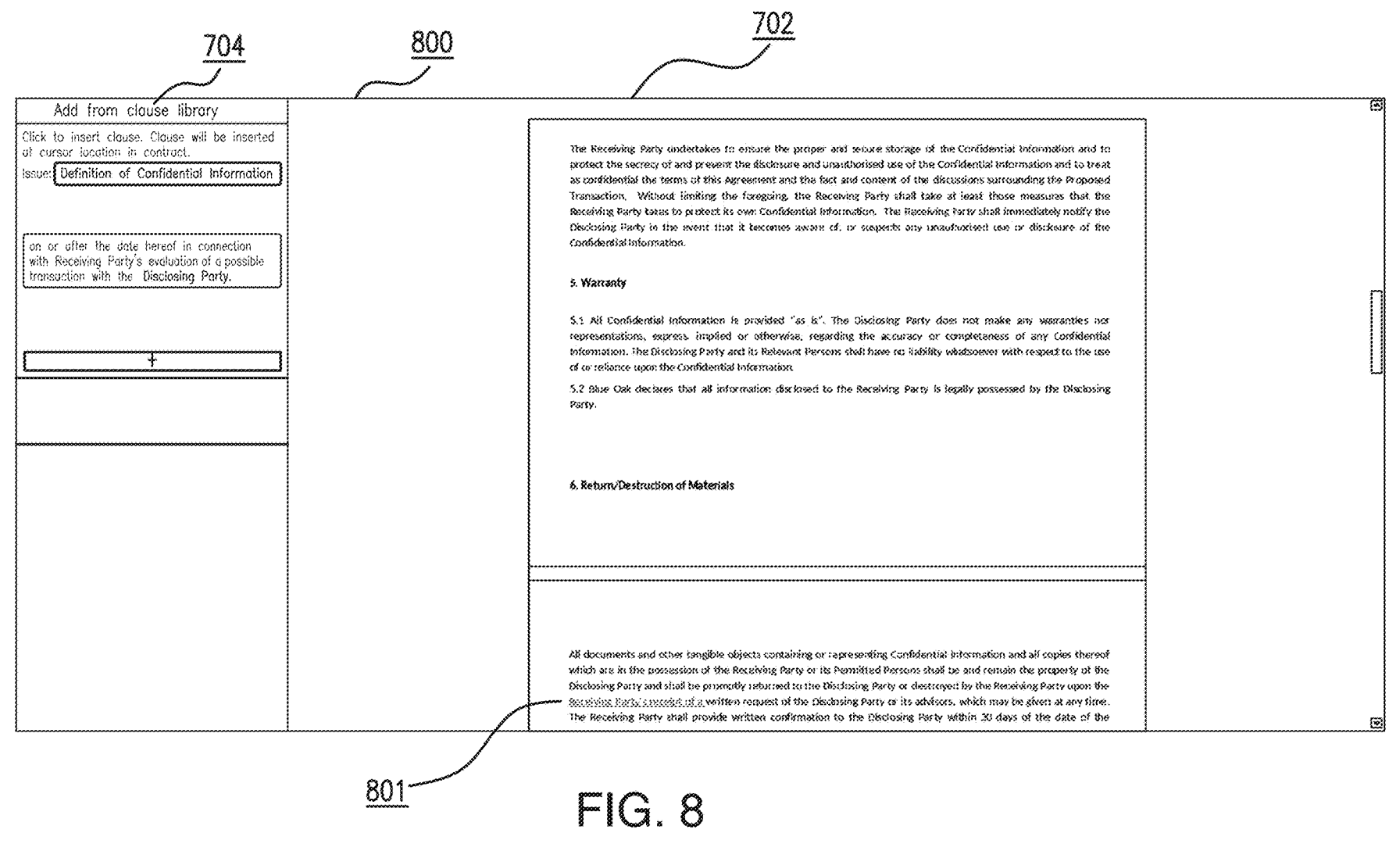

FIG. 8 is a screen capture of a user interface for inserting a clause into a document under analysis, according to some embodiments. As shown in FIG. 8, the user interface 800 may be a graphical user interface comprising the document user interface 702 and a clause library user interface 704. In some embodiments, document user interface 702 is displayed in a first area of user interface 800, and clause library user interface 704 is displayed in a second area of user interface 800 different than the first area. Alternatively, document user interface 702 and clause library user interface 704 may be displayed in separate windows or other graphical elements on the screen.

In some embodiments, the document user interface 702 may display one or more DUA. In some embodiments, the document user interface 702 is interactive and enables a user to make one or more modifications to the DUA, such as addition 801, using an input device such as a keyboard and/or mouse connected to user device 102.

Figure 9A:
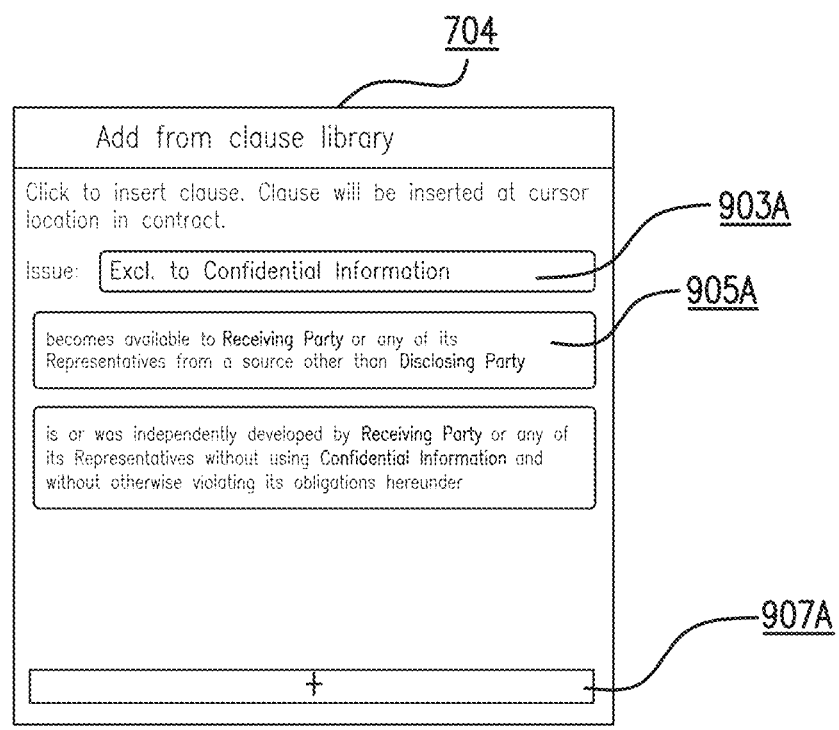
FIGS. 9A-9C are screen captures of a clause library user interface, according to some embodiments.
Figure 9B:
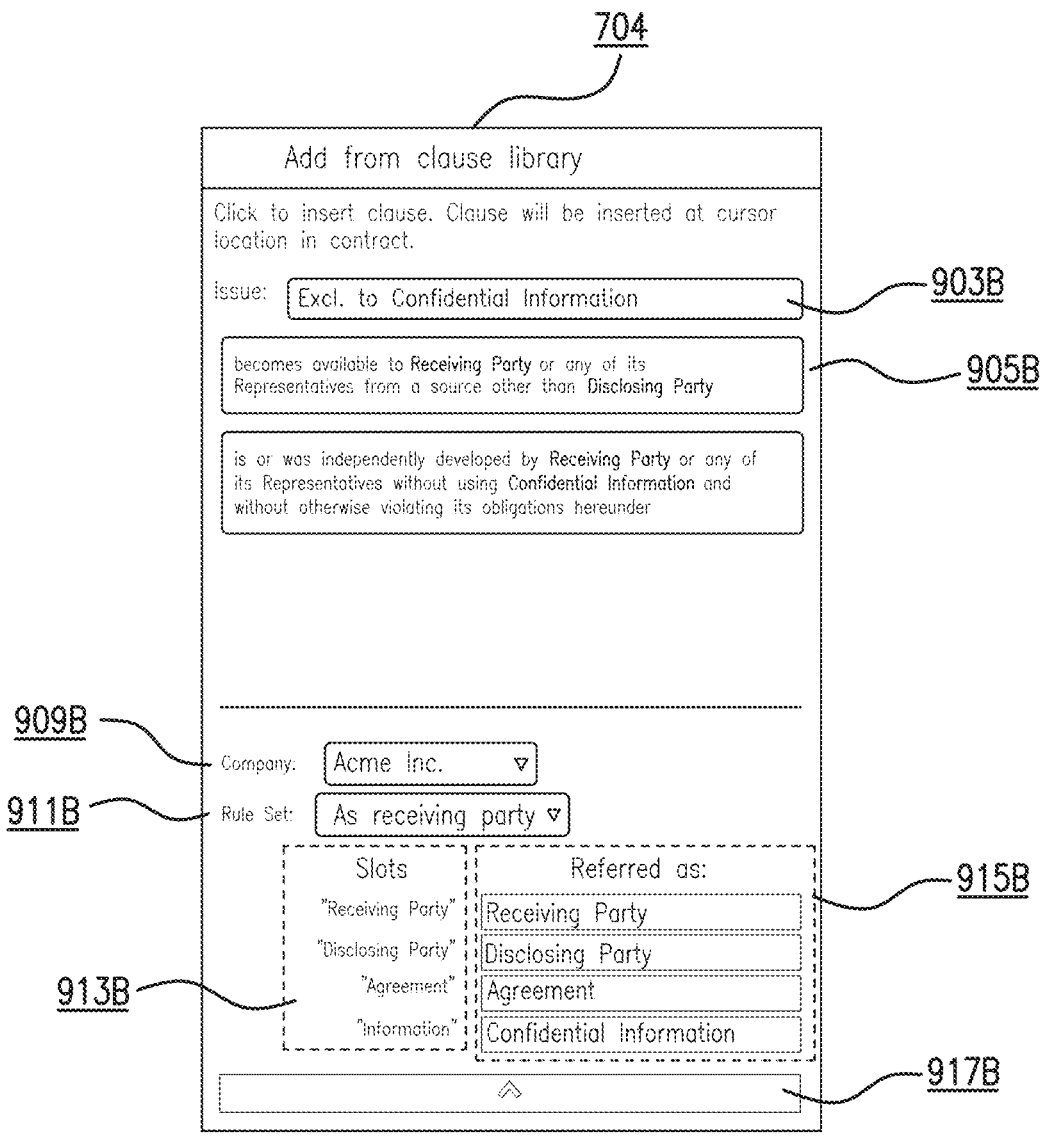
Figure 9C:
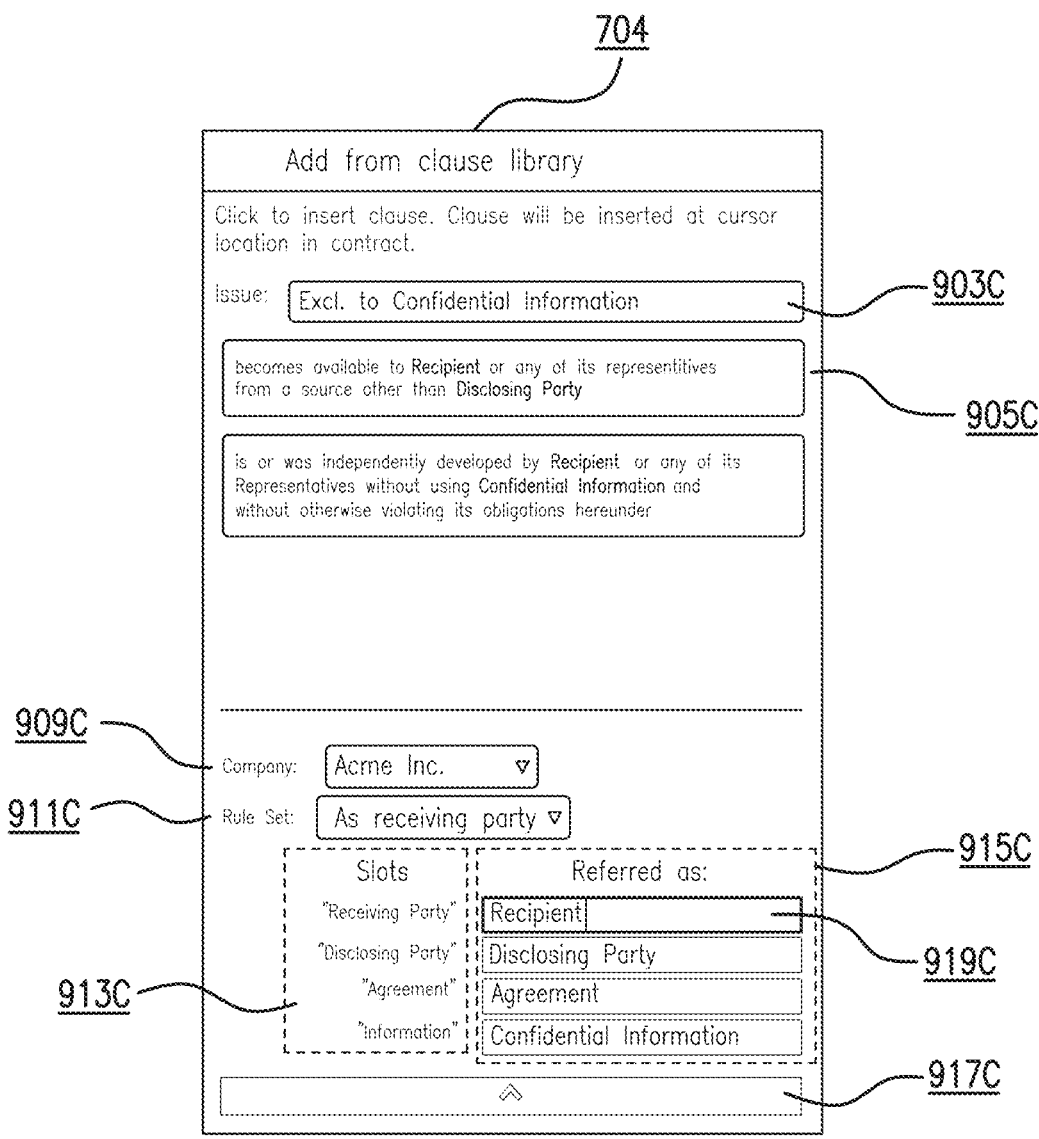

FIGS. 9A-9C are screen captures of a clause library user interface, according to some embodiments.

FIG. 9A depicts a closer view of the clause library user interface 704, which is configured to display one or more clauses 905A. Clause library user interface 704 may further comprise a set of one or more selectable categories, such as issues 903A, that a user may select to narrow the category of clauses shown at any given time in the clause library user interface 704. In some embodiments, the selectable categories 903A may be displayed in a drop down menu or as a set of selectable buttons. In the example shown in FIG. 9A, the selected issue 903A is "Exclusions to Confidential Information," and two selectable clauses 905A pertaining to that issue are displayed in the clause library user interface 704.

In FIG. 8, a different issue is shown as having been selected, "Definition of Confidential Information," and a single selectable clause pertaining to that issue is shown in clause library user interface 704. In some embodiments, Clause Library 704 further includes a selectable drop down menu or icon, such as the "+" button 907A shown in FIG. A, which can expand the area of clause library user interface 704 to reveal additional functionality.

FIG. 9B depicts an expanded view of the clause library user interface 704. As shown in FIG. 9B, clause library user interface 704 comprises the selectable categories, such as issues 903B and one or more selectable clauses 905B corresponding to the selected category 903B. The clause library user interface 704 further shows an expanded view, which may be displayed, e.g., after a user selects the "+" button 907A shown in FIG. A.

The expanded area of clause library user interface 704 reveals additional user interface elements. For example, the clause library user interface 704 may include an option to select a company 909B and a rule set 911B. FIG. 9B depicts these GUI items as drop down menus, but other interface mechanisms for selecting a company 909B and 911B may be used. The company 909B and rule set 911B may be used to specify a specific set of Typical Clauses that may be applicable for a specific DUA. For example, imagine if a user from a law firm was interacting with the system. Such a client would have multiple clients, and each client may have a different rule set. Further, each client may have different rule sets for different types of documents, e.g., mutual non-disclosure agreements versus non-disclosure agreements where they are solely the receiving party and not disclosing any data.

In some embodiments, Client Clauses are stored in the clause library database as a Map, linking a client's company list (its own clients, typically, or itself) to its rule sets. Example rule sets may be, for example, "Mutual" or "As receiving party," and each rule is associated with specific clause types such as "Return of Information" that can be displayed in the clause library user interface 704 and made available for insertion. In some embodiments, within clause texts in the database, keywords such as "$ReceivingParty" are present where client preferences for slot values should be substituted. Slot values are retrieved from the slot database for the current document and provided as default substitution values in the clause library user interface 704. The "Slots" fields are populated according to the slots relevant to the selected clause type, company and ruleset. As discussed in further detail below, the user is offered an opportunity, in the "Referred as" input fields to override defaults. Overridden defaults may be stored as user preference in the clause library database 105.

In some embodiments, the expanded area of clause library user interface 704 further depicts one or more Slot types 913B that have been identified in a currently displayed DUA (e.g., the DUA currently being depicted in the document user interface 702), and corresponding Slot values 915B that have been assigned to the one or more Slot types 913B. For example, FIG. 9B depicts that the clause library system assigned the "Receiving Party," "Disclosing Party," "Agreement," and "Information" Slot types 913B the Slot values 913B "Receiving Party," "Disclosing Party," "Agreement," and "Confidential Information," respectively.

In some embodiments, a selectable button or icon 917B may be displayed in clause library user interface 704, e.g. the "" button, in order to hide the expanded functionality and return to the view of clause library user interface 704 shown in FIG. 9A.

FIG. 9C depicts another expanded view of the clause library user interface 704, including the same user interface elements as discussed above for FIG. 9B. As shown in FIG. 9C, however, the Slot values 919C may further be editable by a user. For example, a user may select, using a pointing device such as a mouse, one of the Slot values 919C. After selecting one of the Slot values 919C, such as the "Receiving Party" Slot value 919C for the Slot Type 913C "Receiving Party," the user may provide input to edit the Slot Value 919C. In the example shown in FIG. 9C, the user has edited the Slot value 919C for the Slot Type 913C "Receiving Party" to say "Recipient." In some embodiments, the user input may be provided using a keyboard, a stylus, a voice recognition interface, or the like.

In some embodiments, after receiving user input to edit a Slot value 919C for a particular Slot Type 913C, the clause library system automatically updates the clauses 905C to reflect the edited slot value. For example, as shown in FIG. 9C, the clauses 905C have been updated to use the edited Slot value 919C "Recipient" for the "Receiving Party" Slot type 913C.

Figure 10A:
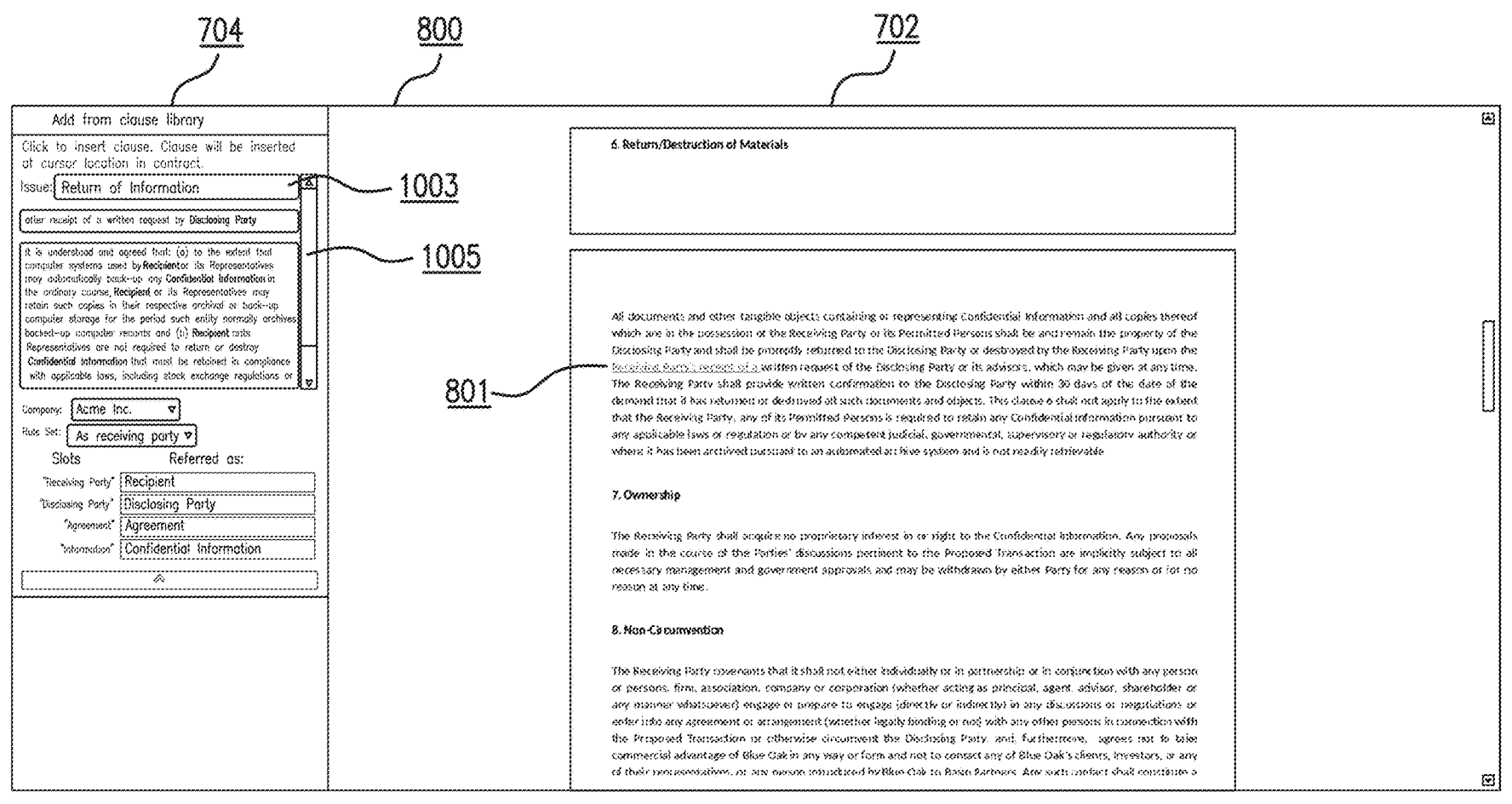
Figure 10B:
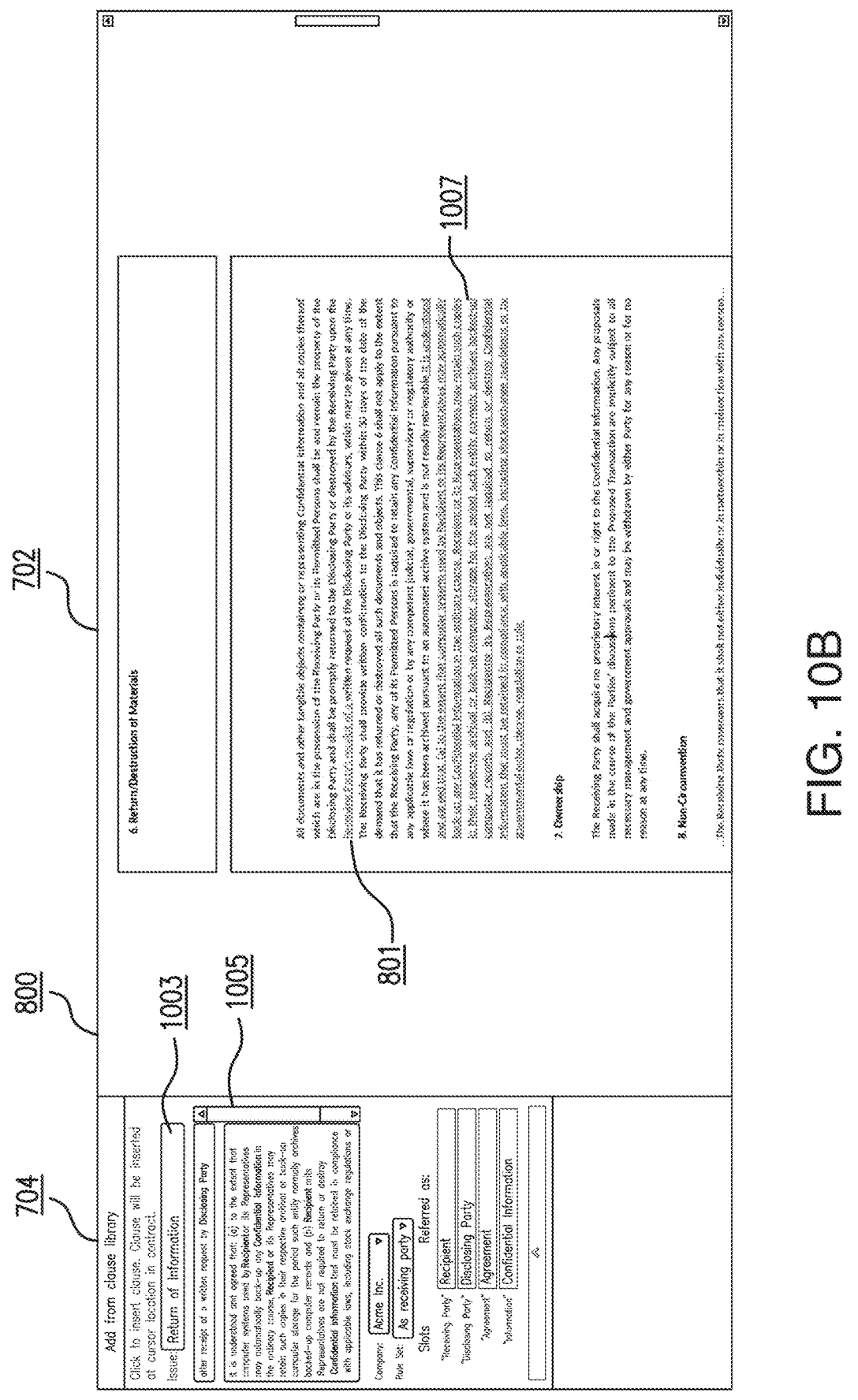

FIGS. 10A-10B are screen captures of a user interface for inserting a selected clause into a document under analysis, according to some embodiments.

FIG. 10A depicts a view of the user interface 800 including both the document user interface 702 displaying a DUA and the expanded clause library user interface 704 as discussed above in connection with FIGS. 9B-9C. An edit 801 to the DUA is further depicted in the document user interface 702 of FIG. 10A. User interface 800 of FIG. 10A further shows two selectable clauses 1005 corresponding to the category 1003, "Issue: Return of Information."

FIG. 10B depicts a second view of the user interface 800 including both the document user interface 702 displaying a DUA and the expanded clause library user interface 704, after a user had selected one of the clauses 1005 for insertion into the DUA. In the example shown in FIG. 10B, after a user has selected the second clause 1005 displayed in clause library user interface 704, the selected clause is inserted into the DUA (1007) displayed in the document user interface 702. In some embodiments, a user can specify the location of insertion of a clause into the DUA by positioning a cursor at the desired location in the DUA displayed in document user interface 702. Thus, according to some embodiments, a user can insert a customized clause for the DUA (e.g., updated to reflect the terminology/Slots used in the DUA), with a single mouse click.

Figure 11:
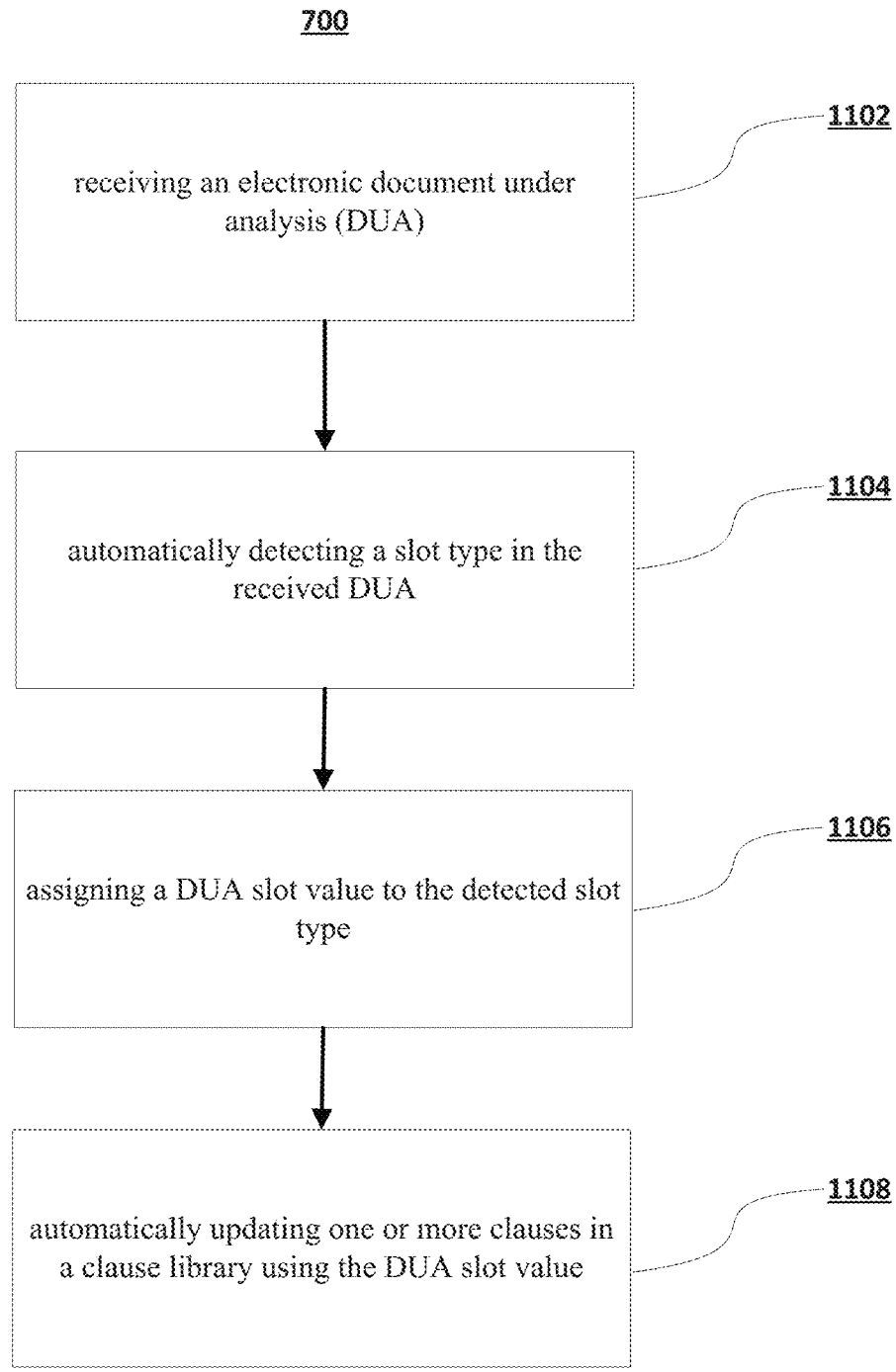
FIG. 11 is a method for insertion of a clause into an electronic document under analysis, according to some embodiments.

FIG. 11 is a method for customization and insertion of a clause into an electronic document under analysis, according to some embodiments. According to some embodiments, method 700 of FIG. 11 may correspond to the clause customization process 700 discussed in FIG. 7. According to some embodiments, method 700 may be performed by application server 101. In other embodiments, method 700 may be performed by user device 104, and/or user device 104 in conjunction with application server 101.

At step 1102, an electronic document under analysis (DUA) is received.

At step 1104, a slot type in the received DUA is automatically detected. According to some embodiments, the trained model discussed above and in connection with FIGS. 2-5 is used to detect a slot type in the received DUA. According to some embodiments, the detected slot type corresponds to one of an annotated slot type from the training corpus. For example, the detected slot type may be "Receiving Party," "Disclosing Party," "Agreement," or "Confidential Information," but the slot types are not limited by these enumerated examples.

At step 1106, a DUA slot value is assigned to the detected slot type. For example, as discussed above, a surface form from the DUA may be used as the assigned slot value for the detected slot type.

At step 1108, one or more clauses in a clause library are updated using the DUA slot value. In some embodiments, the updating comprises inserting the DUA slot value into each slot in the one or more clauses having a slot type matching the detected slot type.

Figure 12:
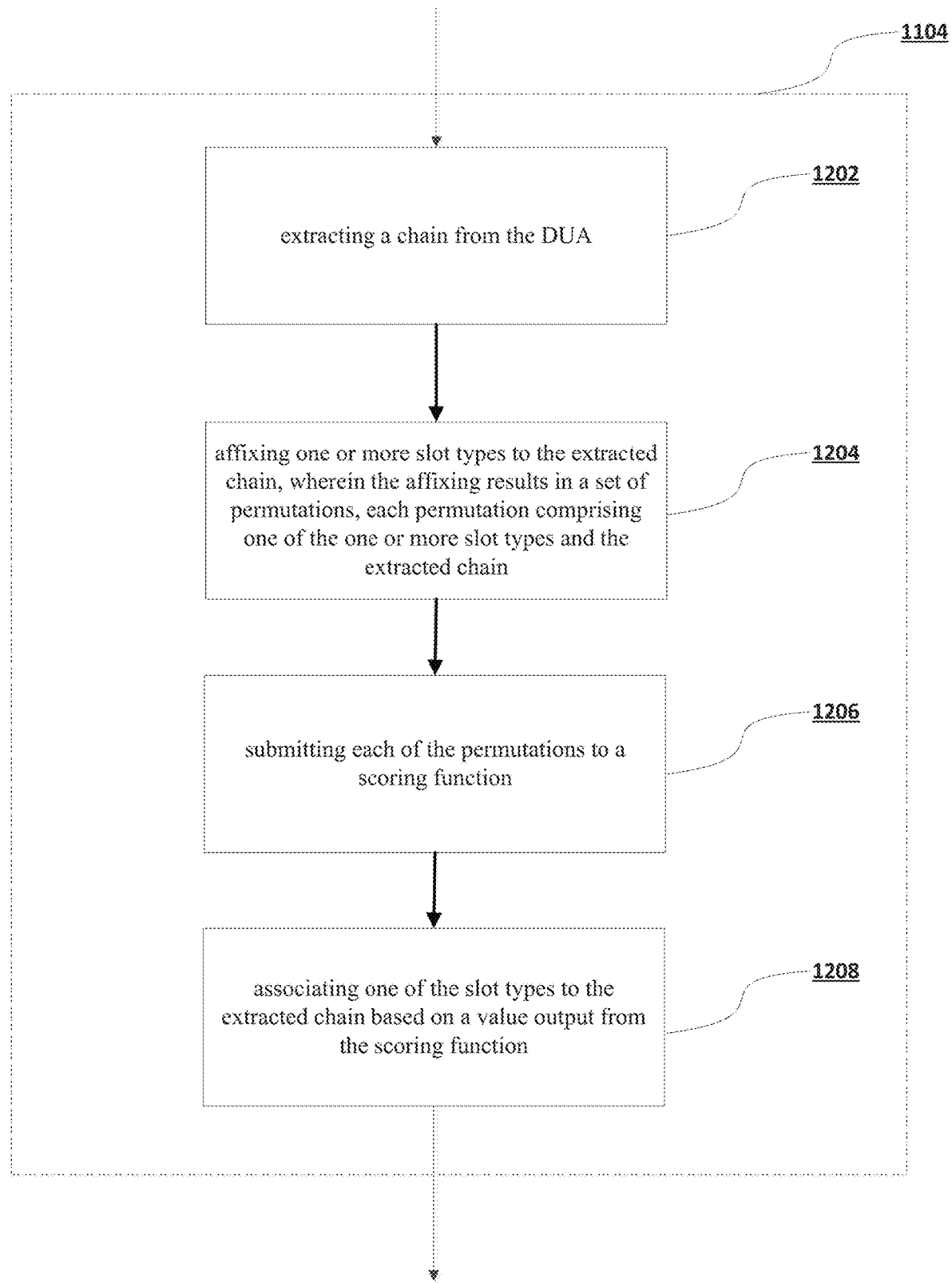
FIG. 12 is a method for detecting a slot type in a received document under analysis, according to some embodiments.

FIG. 12 is a method for detecting a slot type in a received document under analysis, according to some embodiments. In some embodiments, FIG. 12 is a flow diagram of the steps for automatically detecting a slot type in the received DUA at step 1104 of FIG. 11.

At step 1202, a chain is extracted from the DUA. For example, as discussed above in connection with FIGS. 2-3, a linguistic annotation may performed over the DUA using one or more techniques, including but not limited to word tokenization, sentence tokenization, part of speech tagging, sentence parsing, and coreference resolution, among others, in order to extract one or more chains from the DUA.

At step 1204, one or more slot types are affixed with the extracted chain. The affixing results in a set of permutations, each permutation comprising one of the one or more slot types and the extracted chain. At step 1206, each of the permutations is submitted to a scoring function. At step 1208, one of the slot types is associated to the extracted chain based on a value output from the scoring function.

For example, as discussed above in connection with FIG. 4, a set of permutations may be created with the extracted chain and each annotated Slot type. A set of score values may be generated for each permutation by submitting the permutation to a score (e.g., the trained model, or another function). Each score value may reflect how suited the extracted chain is to each slot type, and the scores may be ranked in order to assign a chain to a slot type.

Figure 13:
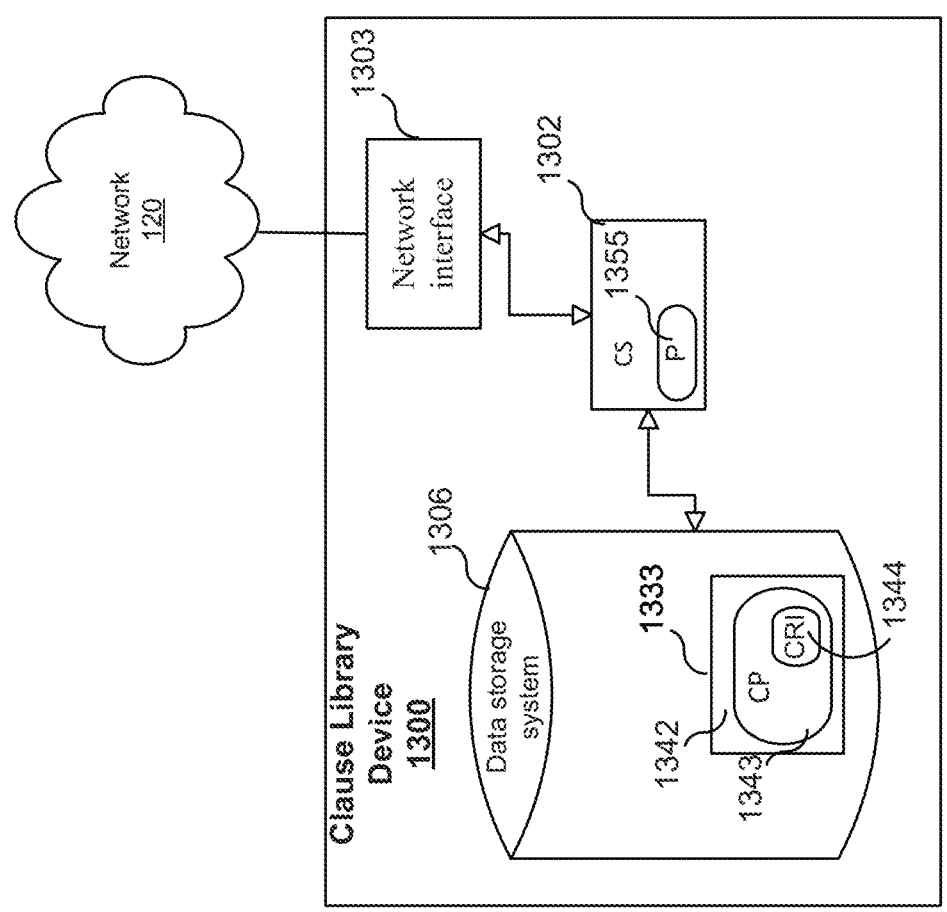
FIG. 13 is a block diagram illustrating a clause library device, according to some embodiments.

FIG. 13 is a block diagram illustrating a clause library device, according to some embodiments. In some embodiments, clause library device 1300 is application server 101. As shown in FIG. 13, clause library device 1300 may comprise: a data processing system (DPS) 1302, which may include one or more processors 1355 (e.g., a general purpose microprocessor and/or one or more other data processing circuits, such as an application specific integrated circuit (ASIC), field-programmable gate arrays (FPGAs), and the like); a network interface 1303 for use in connecting clause library device 1300 to network 120; and local storage unit (a.k.a., "data storage system") 1306, which may include one or more non-volatile storage devices and/or one or more volatile storage devices (e.g., random access memory (RAM)). In embodiments where clause library device 1300 includes a general purpose microprocessor, a computer program product (CPP) 1333 may be provided. CPP 1333 includes a computer readable medium (CRM) 1342 storing a computer program (CP) 1343 comprising computer readable instructions (CRI) 1344. CRM 1342 may be a non-transitory computer readable medium, such as, but not limited, to magnetic media (e.g., a hard disk), optical media (e.g., a DVD), memory devices (e.g., random access memory), and the like. In some embodiments, the CRI 1344 of computer program 1343 is configured such that when executed by data processing system 1302, the CRI causes the clause library device 1300 to perform steps described above (e.g., steps described above with reference to the flow charts). In other embodiments, clause library device 1300 may be configured to perform steps described herein without the need for code. That is, for example, data processing system 1302 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A computer-implemented method comprising:
receiving a training corpus comprising a plurality of documents, wherein each of the documents comprises one or more slot types;
normalizing each of the one or more slot types in the plurality of documents in the training corpus with a representation of a respective slot type;
obtaining a document under analysis (DUA);
automatically detecting a slot type in the DUA;
normalizing the detected slot type in the DUA with a representation of the detected slot type in the DUA; and,
determining, using the training corpus and the normalized detected slot type in the DUA, an edit operation to apply to the DUA.

2. The method of claim 1, further comprising:
assigning a DUA slot value to the detected slot type in the DUA.

3. The method of claim 2, further comprising:
applying the determined edit operation to the DUA; and,
replacing the representation of the detected slot type in the DUA with the assigned DUA slot value.

4. The method of claim 2, the method further comprising:
automatically updating one or more clauses in a clause library using the DUA slot value, wherein the updating comprises inserting the DUA slot value into each slot in the one or more clauses having a slot type matching the detected slot type.

5. The method of claim 4, further comprising:
displaying the DUA on a graphical user interface;
displaying the updated one or more clauses on the graphical user interface;
receiving an indication that a user has selected one of the displayed updated one or more clauses; and
inserting into the DUA the selected updated clause.

6. The method of claim 5, further comprising:
displaying the detected slot type and the assigned DUA slot value in the graphical user interface.

7. The method of claim 6, further comprising:
receiving an instruction to modify the DUA slot value from a user; and,
automatically updating the one or more clauses in the clause library using the modified DUA slot value.

8. The method of claim 5, wherein the graphical user interface comprises a first area for displaying the DUA and a second area for displaying the updated one or more clauses, wherein the step of inserting into the DUA the selected updated clause comprises:
inserting the selected updated clause at a location of a cursor in the DUA displayed in the first area of the graphical user interface.

9. The method of claim 1, wherein automatically detecting a slot type in the DUA further comprises:
extracting a chain from the DUA;
affixing one or more slot types to the extracted chain, wherein the affixing results in a set of permutations, each permutation comprising one of the one or more slot types and the extracted chain;
submitting each of the permutations to a scoring function; and,
associating one of the slot types to the extracted chain based on a value output from the scoring function.

10. The method of claim 1, further comprising:
receiving a set of annotations, the annotations comprising a surface form of each of the one or more slot types for each corresponding document in the training corpus.

11. The method of claim 1, further comprising:
tokenizing the DUA into one or more statements-under-analysis (SUAs);
obtaining from the training corpus a candidate original text;
obtaining from the training corpus a candidate final text associated with the candidate original text; and,
determining the edit operation by aligning the SUA with at least one of the candidate original text and the candidate final text.

12. A non-transitory computer readable medium storing instructions configured to cause a computer to perform the method of claim 1.

13. A system comprising:
a processor;
a non-transitory computer readable memory coupled to the processor, wherein the processor is configured to:
receive a training corpus comprising a plurality of documents, wherein each of the documents comprises one or more slot types;
normalize each of the one or more slot types in the plurality of documents in the training corpus with a representation of a respective slot type;
obtain a document under analysis (DUA);
automatically detect a slot type in the DUA;
normalize the detected slot type in the DUA with a representation of the detected slot type in the DUA; and
determine, using the training corpus and the normalized detected slot type in the DUA, an edit operation to apply to the DUA.

14. The system of claim 13, wherein the processor is further configured to:
assign a DUA slot value to the detected slot type in the DUA.

15. The system of claim 14, wherein the processor is further configured to:
apply the determined edit operation to the DUA; and,
replace the representation of the detected slot type in the DUA with the assigned DUA slot value.

16. The system of claim 14, wherein the processor is further configured to:
automatically update one or more clauses in a clause library using the DUA slot value, wherein the update comprises an insertion of the DUA slot value into each slot in the one or more clauses having a slot type matching the detected slot type.

17. The system of claim 16, further comprising:
a display device coupled to the processor,
wherein the processor is further configured to:
   display the DUA on a graphical user interface of the display device;
   display the updated one or more clauses on the graphical user interface;
   receive an indication that a user has selected one of the displayed updated one or more clauses; and
   insert into the DUA the selected updated clause.

18. The system of claim 13, wherein the processor is further configured to:
   extract a chain from the DUA;
   affix one or more slot types to the extracted chain, wherein the affixation results in a set of permutations, each permutation comprising one of the one or more slot types and the extracted chain;
   submit each of the permutations to a scoring function; and,
   associate one of the slot types to the extracted chain based on a value output from the scoring function.

19. The system of claim 13, wherein the processor is further configured to:
   receive a set of annotations, the annotations comprising a surface form of each of the one or more slot types for each corresponding document in the training corpus.

20. The system of claim 13, wherein the processor is further configured to:
   tokenize the DUA into one or more statements-under-analysis (SUAs);
   obtain from the training corpus a candidate original text;
   obtain from the training corpus a candidate final text associated with the candidate original text; and,
   determine the edit operation by aligning the SUA with at least one of the candidate original text and the candidate final text.

* * * * *